(12) United States Patent
Seo et al.

(10) Patent No.: US 12,379,250 B2
(45) Date of Patent: Aug. 5, 2025

(54) HYPERSPECTRAL IMAGING DEVICE AND OPERATION METHOD OF THE SAME

(71) Applicant: ELECTRONICS AND TELECOMMUNICATIONS RESEARCH INSTITUTE, Daejeon (KR)

(72) Inventors: Hong-Seok Seo, Daejeon (KR); Dong Hoon Song, Daejeon (KR); Chul Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 109 days.

(21) Appl. No.: 18/232,438

(22) Filed: Aug. 10, 2023

(65) Prior Publication Data

US 2024/0319009 A1    Sep. 26, 2024

(30) Foreign Application Priority Data

Mar. 21, 2023   (KR) .......................... 10-2023-0036851

(51) Int. Cl.
*G01J 3/28* (2006.01)
*G01J 3/02* (2006.01)
(Continued)

(52) U.S. Cl.
CPC ........... *G01J 3/2823* (2013.01); *G01J 3/0208* (2013.01); *G01J 3/0218* (2013.01); *G01J 3/0224* (2013.01);
(Continued)

(58) Field of Classification Search
CPC ...... G01J 3/2823; G01J 3/0208; G01J 3/0218; G01J 3/0224; G01J 3/4338;
(Continued)

(56) References Cited

U.S. PATENT DOCUMENTS 7,668,256 B2   2/2010   Giles et al.
8,233,148 B2   7/2012   Bodkin et al.
(Continued)

FOREIGN PATENT DOCUMENTS

KR   10-2012-0067268 A   6/2012
KR   10-2016-0053006 A   5/2016
(Continued)

*Primary Examiner* — Sang H Nguyen
(74) *Attorney, Agent, or Firm* — LRK PATENT LAW FIRM

(57) ABSTRACT

Disclosed is a hyperspectral imaging device, which includes a code generator that generates a code signal including first code information and second code information which are orthogonal to each other, a light transmitter that receives the code signal and generates output light including first modulated light modulated based on the first code information and second modulated light modulated based on the second code information, and a receiver that receives reflected light from which the output light is reflected from a sample and obtains a hyperspectral image based on the reflected light and the code signal, and the first modulated light has a first wavelength band and the second modulated light has a second wavelength band different from the first wavelength band.

15 Claims, 7 Drawing Sheets

(51) Int. Cl.
   *G01J 3/433* (2006.01)
   *G01J 3/42* (2006.01)
(52) U.S. Cl.
   CPC ..... *G01J 3/4338* (2013.01); *G01J 2003/2826* (2013.01); *G01J 2003/423* (2013.01); *G01J 2003/4334* (2013.01)
(58) Field of Classification Search
   CPC ......... G01J 2003/2826; G01J 2003/423; G01J 2003/4334; G01J 3/10; G01J 3/42
   See application file for complete search history.

(56) References Cited

U.S. PATENT DOCUMENTS

| | | |
|---|---|---|
| 10,254,165 B2 | 4/2019 | Bae et al. |
| 11,988,603 B2 | 5/2024 | Vaziri |
| 2017/0169830 A1 | 6/2017 | Beack et al. |
| 2018/0073976 A1 | 3/2018 | Imoto |
| 2018/0322611 A1 | 11/2018 | Bang et al. |
| 2019/0239752 A1* | 8/2019 | Dumitrescu ......... A61B 5/7264 |
| 2023/0309834 A1* | 10/2023 | Loock ................ A61B 1/0655 |
| | | 600/300 |

FOREIGN PATENT DOCUMENTS

| | | | |
|---|---|---|---|
| KR | 10-2019-0082252 A | 7/2019 | |
| KR | 10-2020-0004233 A | 1/2020 | |
| KR | 10-2022-0048930 A | 4/2022 | |
| WO | WO-2007047732 A2 * | 4/2007 | ................ G01J 3/02 |
| WO | WO-2021216922 A1 * | 10/2021 | ........... A61B 5/0075 |
| WO | WO-2022060293 A1 * | 3/2022 | ............ G01J 3/0218 |

\* cited by examiner

HYPERSPECTRAL IMAGING DEVICE AND OPERATION METHOD OF THE SAME

CROSS-REFERENCE TO RELATED APPLICATION

This application claims priority under 35 U.S.C. § 119 to Korean Patent Application No. 10-2023-0036851 filed on Mar. 21, 2023, in the Korean Intellectual Property Office, the disclosures of which are incorporated by reference herein in their entireties.

BACKGROUND

1. Field of the Invention

Embodiments of the present disclosure described herein relate to a hyperspectral imaging device, and more particularly, relate to a hyperspectral imaging device including a plurality of light sources generating a plurality of wavelength bands and an operation method thereof.

2. Description of Related Art

Recently, hyperspectral imaging devices (e.g., cameras) are used for various skin diseases, surgical sites, endoscopic diagnosis, and surgery according to diseases. In the field of agriculture and forestry, it is also possible to analyze the condition of fruit flesh or plants.

The hyperspectral imaging devices are used not only in the medical field but also in various fields such as environmental monitoring, air pollution, water pollution (green algae in summer), forest pests, and crop growth.

One kind of spectroscopy method of the hyperspectral cameras is that a plurality of (six or more) spectral filters are attached to the camera pixel itself, and a spectral image can be viewed directly without replacing the spectral filter, but has the disadvantage of being very expensive.

As another kind of spectroscopy method, there is a method of processing an image while a spectral filter rotates through a mechanical spectral filter exchange device inside a camera. This method has a disadvantage that real-time image processing is difficult.

In another kind of spectroscopy method, there is a method in which a plurality of focusing lenses are placed inside the camera and different spectroscopic filters are placed in front of them so that multiple identical images are performed on a charge-coupled device (CCD) or complementary metal-oxide semiconductor (CMOS) cells. This method has a problem in that the optical system is complicated by placing a composite optical lens and a spectral filter, and images in different optical positions are obtained instead of the same field of view.

SUMMARY

Embodiments of the present disclosure provide a hyperspectral imaging device that does not use a spectral filter.

Embodiments of the present disclosure provide a hyperspectral imaging device that is miniaturized and has low manufacturing cost.

Embodiments of the present disclosure provide a method for obtaining a hyperspectral image without using a spectral filter.

Embodiments of the present disclosure provide a method for obtaining a hyperspectral image method that is miniaturized and has low manufacturing cost.

The problems that are achieved through present disclosure may not be limited to what has been particularly described herein, and other problems not described herein may be more clearly understood from the following detailed description by persons skilled in the art.

According to an embodiment of the present disclosure, a hyperspectral imaging device includes a code generator that generates a code signal including first code information and second code information which are orthogonal to each other, a light transmitter that receives the code signal and generates output light including first modulated light modulated based on the first code information and second modulated light modulated based on the second code information, and a receiver that receives reflected light from which the output light is reflected from a sample and obtains a hyperspectral image based on the reflected light and the code signal, and the first modulated light has a first wavelength band and the second modulated light has a second wavelength band different from the first wavelength band.

According to an embodiment, the transmitter may include a light source controller that receives the code signal and generates a first control signal based on the first code information and a second control signal based on the second code information, a first light source that generates the first modulated light based on the first control signal, and a second light source that generates the second modulated light based on the second control signal.

According to an embodiment, each of the first light source and the second light source may include a pulse laser or a light-emitting diode (LED).

According to an embodiment, the first light source may be configured to generate the first modulated light by adjusting a time for generating light based on the first code information, and the second light source may be configured to generate the second modulated light by adjusting a time for generating light based on the second code information.

According to an embodiment, the first light source and the second light source may be configured to encode the first code information and the second code information into the first modulated light and the second modulated light by a pulse amplitude modulation method.

According to an embodiment, the transmitter may further include an optical combiner that focuses the first modulated light and the second modulated light, and an optical fiber that transfers the focused first modulated light and the second modulated light.

According to an embodiment, the receiver may include a light conversion unit that generates a conversion signal by converting the reflected light into an electrical signal, the conversion signal being including reflection data including data on the sample for each wavelength band, and an inner product that performs an inner product of the reflection data and the first code information to generate an extraction signal including information on the sample in the first wavelength band.

According to an embodiment, the light conversion unit may be a camera.

According to an embodiment, the inner product unit may perform the inner product by substituting '1' for an "1" bit of the first code information and by substituting '−1' for a "0" bit of the first code information.

According to an embodiment, the inner product unit may include at least one of an integrated circuit, software, or firmware for performing the inner product.

According to an embodiment, the receiver may further include a display unit that displays the hyperspectral image based on the extraction signal.

According to an embodiment, the display unit may include any one of a liquid crystal display (LCD), a light emitting diode (LED), an organic light emitting diode (OLED), a cathode ray tube (CRT) display, an e-Paper display, and a touch screen display.

According to an embodiment, the first code information and the second code information are Walsh codes.

According to an embodiment, the hyperspectral imaging device may further include a first polarization filter provided between the receiver and the sample and that transmits only components in a first direction, and a second polarization filter provided between the transmitter and the sample and that transmits only components in a second direction perpendicular to the first direction.

According to an embodiment of the present disclosure, a method of operating a hyperspectral imaging device includes generating a code signal including first code information and second code information which are orthogonal to each other, generating output light based on the code signal, the output light being including first modulated light encoded with the first code information and second modulated light encoded with the second code information, irradiating the output light onto a sample, receiving reflected light reflected from the sample, and obtaining a hyperspectral image from the reflected light based on the code signal.

According to an embodiment, the first modulated light and the second modulated light may be generated by encoding the first code information and the second code information by a pulse amplitude modulation method.

According to an embodiment, the obtaining of the hyperspectral image may include generating a conversion signal by converting the reflected light into an electrical signal, the conversion signal being including reflection data including data on the sample for each wavelength band, and performing an inner product on the reflection data and the first code information to obtain a hyperspectral image including information on the sample in the first wavelength band.

According to an embodiment, the first code information and the second code information are Walsh codes.

BRIEF DESCRIPTION OF THE DRAWINGS

A detailed description of each drawing is provided to facilitate a more thorough understanding of the drawings referenced in the detailed description of the present disclosure.

DETAILED DESCRIPTION

Figure 1:
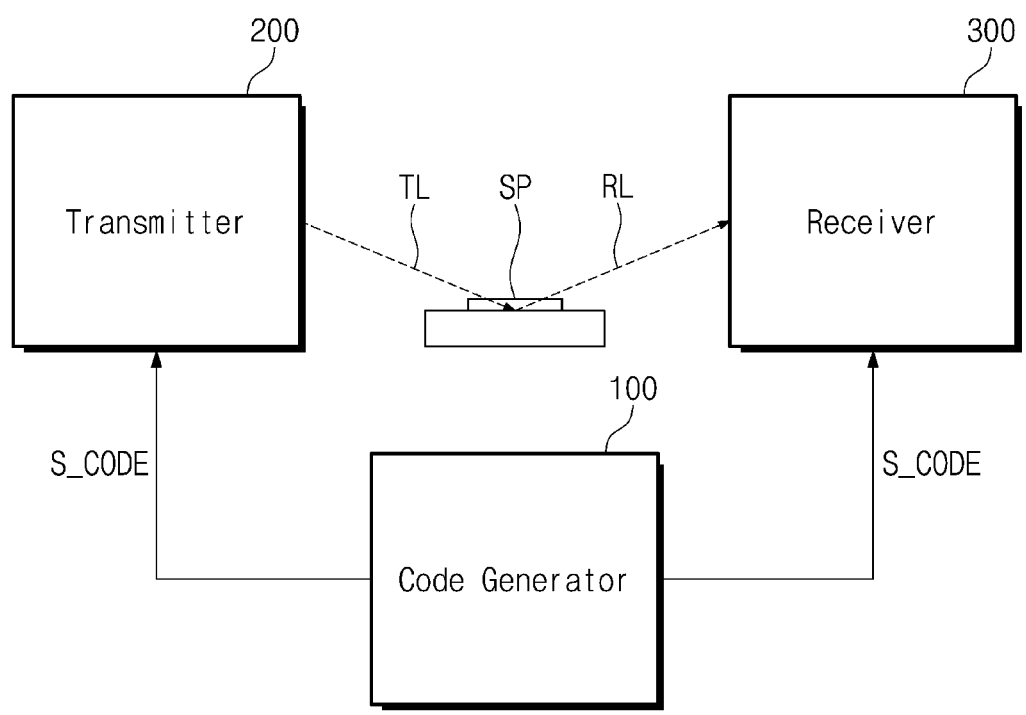
FIG. 1 is a diagram illustrating a hyperspectral imaging device according to an embodiment of the present disclosure.

Hereinafter, embodiments of the present disclosure will be described clearly and in detail such that those skilled in the art may easily carry out the present disclosure.

Reference throughout this specification to "one embodiment" or "an embodiment" means that a particular feature, structure, or characteristic described in connection with embodiments may be included in at least one embodiment disclosed herein. Thus, appearances of the phrases (or other phrases having a similar meaning) "in one embodiment" or "in an embodiment" or "according to an embodiment" in various places throughout this specification are not necessarily all referring to the same embodiment. Also, particular features, structures, or characteristics may be combined in any suitable way in one or more embodiments. In this regard, as used herein, the word "exemplary" means "providing an example, instance, or illustration." Any embodiment described herein as "exemplary" should not necessarily be construed as preferred or advantageous over other embodiments. Also, depending on the context of the discussion herein, a singular term may include a corresponding plural form and a plural term may include a corresponding singular form. It should be noted that the various figures (including block diagrams) illustrated and discussed herein are for illustrative purposes only, and are not drawn to real scale. Similarly, various waveforms and timing diagrams are illustrated for illustrative purposes only. For example, the dimensions of some components may be exaggerated relative to others for clarity. Also, where considered appropriate, reference signs are repeated in the drawings to indicate corresponding and/or similar components.

The terms used herein are provided to describe the specification embodiments only and are not intended to limit the claimed subject matter. As used herein, the singular forms "a" and "the one" are intended to include the plural forms as well unless the context clearly dictates otherwise. As used herein, the terms "comprising" and/or "including" specify the presence of specified features, integers, steps, operations, elements, and/or components, but it will be further understood that the terms do not exclude the presence or addition of one or more other features, integers, steps, operations, elements, components, and/or groups thereof. As used herein, the terms "first", "second", etc. are used as labels of preceding nouns, and do not imply any type of order (e.g., spatial, temporal, logical, etc.) unless explicitly defined. Also, the same reference numbers may be used throughout more than two of the drawings to refer to parts, components, blocks, circuits, units, or modules having the same or similar function. However, this use is for simplicity of description and ease of discussion. It is not indicated that configurations or structural details of such components or units are the same across all embodiments, or that the commonly referenced parts/modules are the only way to implement the teachings of particular embodiments disclosed herein.

Unless defined otherwise, all terms (including technical and scientific terms) used herein have the same meaning as commonly understood by one of ordinary skill in the art to which this disclosure belongs.

FIG. 1 is a diagram illustrating a hyperspectral imaging device according to an embodiment of the present disclosure.

Referring to FIG. 1, in an embodiment, a hyperspectral imaging device 10 may include a code generator 100, a transmitter 200, and a receiver 300. The hyperspectral imaging device 10 may generate output light TL, may irradiate the output light TL to a sample SP, and may obtain a hyperspectral image based on reflected light RL reflected from the sample SP.

The code generator 100 may be configured to generate a code signal S_CODE. The code signal S_CODE may include a plurality of pieces of code information. Each of the plurality of pieces of code information may include a plurality of bits. For example, each bit may be "1" or "0". The plurality of pieces of code information may be orthogonal to each other.

In this specification, the meaning that a plurality of pieces of code information is orthogonal to each other may mean a case of '0' or negligible noise when performing an inner product of different code information. In this specification, the inner product of code information may mean substituting '1' for the bit of "1", substituting '−1' for the bit of "0", multiplying the bits of each digit, and then summing the bits of the code information. For example, the inner product of "1111" and "1100", which are different code information of 4 digit bits, is 1×1+1×1+1×(−1)+1×(−1)=0. For example, the plurality of pieces of code information may be Walsh codes.

In an embodiment, the code signal S_CODE generated by the code generator 100 may be an electrical signal. For example, the plurality of pieces of code information may be provided to the transmitter 200 and the receiver 300 in the form of electrical signals.

The transmitter 200 may be configured to receive the code signal S_CODE. The transmitter 200 may be configured to generate the output light TL based on the plurality of pieces of code information of the code signal S_CODE. The output light TL may include a plurality of modulated lights having different wavelength bands. Each of the modulated lights may include encoded code information. For example, the transmitter 200 may generate the plurality of modulated lights by encoding each piece of code information into modulated light using a pulse amplitude modulation (PAM) method. The configuration and operation of the transmitter 200 will be described later with reference to FIGS. 2 and 3.

The output light TL generated by the transmitter 200 may be irradiated to the sample SP. The output light TL irradiated to the sample SP may be reflected by the sample SP. The sample SP may be an object having different absorption with respect to a wavelength band. For example, the sample SP may be liver. The reflected light RL reflected from the sample SP may include reflection data. The reflection data may include information on samples SP for each wavelength band.

The receiver 300 may be configured to receive the reflected light RL from the sample SP and to receive the code signal S_CODE generated by the code generator 100. The receiver 300 may be configured to obtain a hyperspectral image from the reflected light RL based on the code signal S_CODE. For example, the receiver 300 may be configured to extract an image of the sample SP of a specific wavelength band by performing the inner product on code information with respect to a desired wavelength band with reflection data of the reflected light RL. The configuration and operation of the receiver 300 will be described later with reference to FIGS. 4 and 5.

Figure 2:
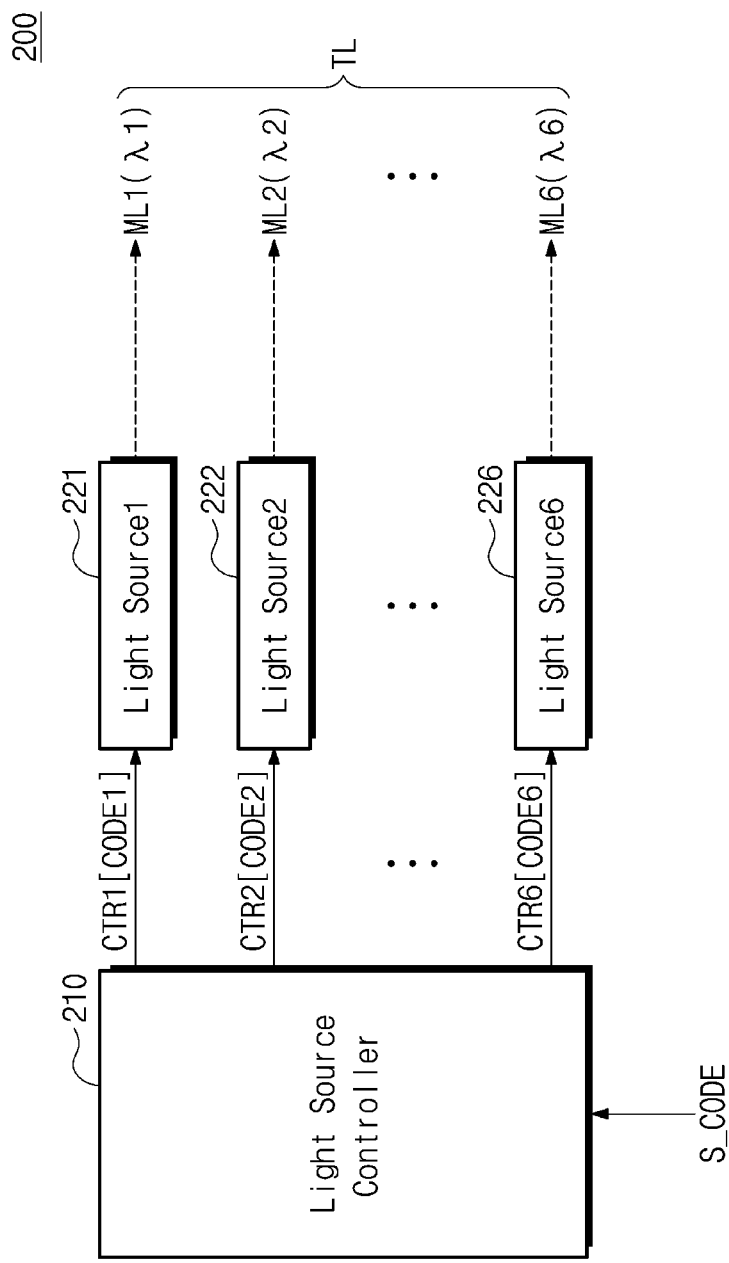
FIG. 2 is a diagram illustrating an example of a transmitter of FIG. 1.
Figure 3:
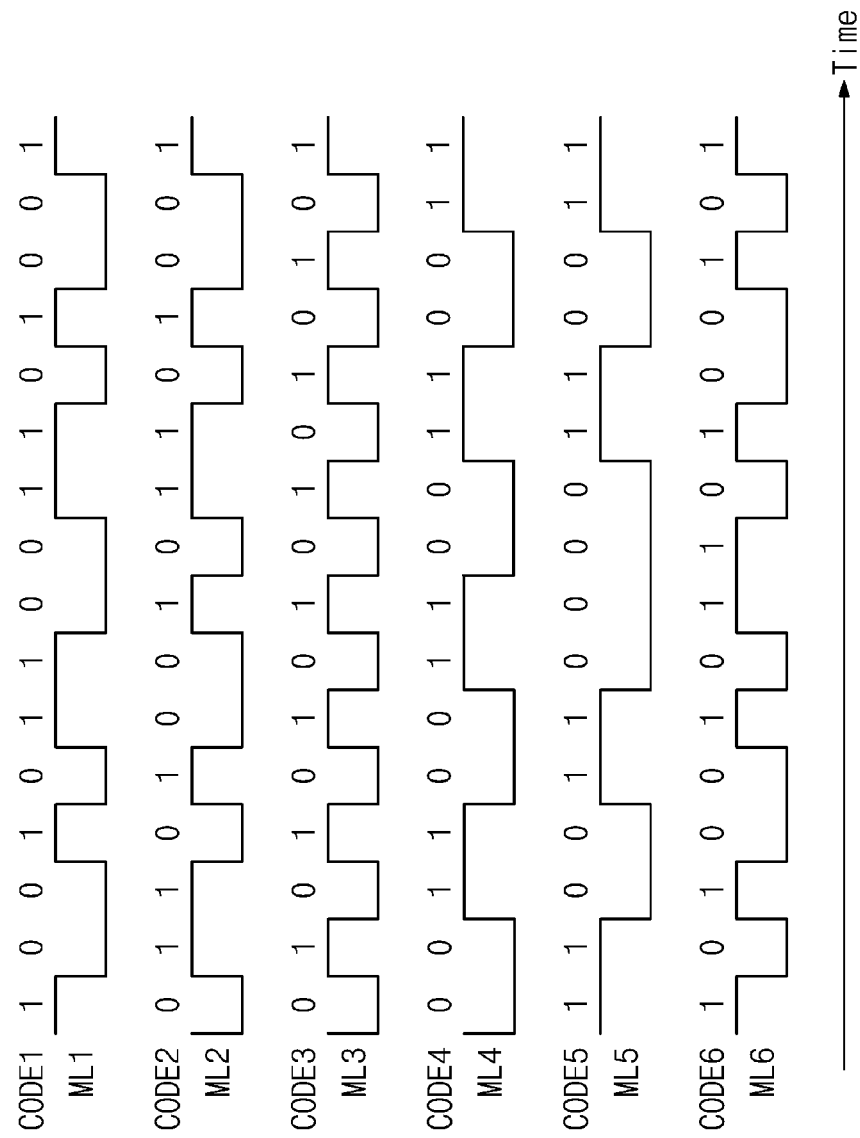
FIG. 3 is a diagram illustrating modulated lights modulated based on code information.

FIG. 2 is a diagram illustrating an example of a transmitter of FIG. 1. FIG. 3 is a diagram illustrating modulated lights modulated based on a plurality of pieces of code information.

Referring to FIG. 2, the transmitter 200 may include a light source controller 210 and a plurality of light sources. For example, the plurality of light sources may include first to sixth light sources 221 to 226. However, it should be understood that the number of light sources is not limited to 6, and may be provided with 'n', less or more than 6.

The light source controller 210 may be configured to receive the code signal S_CODE. The code signal S_CODE may include first to sixth pieces of code information CODE1 to CODE6. The first to sixth pieces of code information CODE1 to CODE6 may be orthogonal to each other.

The light source controller 210 may be configured to generate control signals CTR1 to CTR6 based on each code information. Each of the control signals CTR1 to CTR6 may be generated based on different code information. For example, the first control signal CTR1 may be generated based on the first code information CODE1, the second control signal CTR2 may be generated based on the second code information CODE2, and the sixth control signal CTR6 may be generated based on the sixth code information CODE6.

Each of the control signals CTR1 to CTR6 generated by the light source controller 210 may be provided to the light sources. For example, the first control signal CTR1 may be provided to the first light source 221, the second control signal CTR2 may be provided to the second light source 222, and the sixth control signal CTR6 may be provided to the sixth light source 226.

Each of the light sources 221 to 226 may be configured to generate modulated light based on code information of the control signal received from the light source controller 210. For example, the first light source 221 may generate first modulated light ML1 based on the first control signal CTR1, the second light source 222 may generate second modulated light ML2 based on the second control signal CTR2, and the sixth light source 226 may generate sixth modulated light ML6 based on the sixth control signal CTR6.

Each of the light sources 221 to 226 may be configured to generate modulated light of different wavelength bands. For example, the first light source 221 may generate the first modulated light ML1 of a first wavelength band $\lambda 1$, the second light source 222 may generate the second modulated light ML2 of a second wavelength band $\lambda 2$, and the sixth light source 226 may generate the sixth modulated light ML6 of a sixth wavelength band $\lambda 6$. Each of the light sources may be a pulse laser or a light-emitting diode (LED) having a narrow wavelength band.

Referring to FIG. 3 together, each of a plurality of pieces of code information may include 16-bit code information. In an embodiment, when obtaining a static image with high sharpness, a high signal noise ratio (SNR) may be obtained by increasing the number of bits. In another embodiment, when real-time imaging is required, real-time images may be received by reducing the number of bits. In detail, as the total number of bits of code information increases, the signal value increases and the noise decreases, but the time for data restoration increases. Accordingly, the number of bits may be adjusted according to situations in which imaging is required, such as characteristics of the sample SP and required images.

Each light source may encode the code information into the modulated light by adjusting the light generation time based on the code information. In detail, each light source may encode code information by maintaining the bit of "1" of bits of the code information at a high level for a certain period of time and maintaining the bit of "0" of bits of the code information at a low level for a certain period of time.

In an embodiment, in a period where the modulated light is at a high level, the modulated light may be generated by operation of the light source. In an embodiment, the intensity of the modulated light may be '0' in a period in which the modulated light is at a low level. In other words, the light source may remain turned off.

In detail, increasing the intensity of the modulated light from a low level to a high level may mean changing the light source from an off state to an on state, and increasing the intensity of the modulated light from a high level to a low level may mean changing the light source from an on state to an off state. In other words, each of the plurality of pieces of code information may be temporally distributed and may be encoded into modulated lights of different wavelength bands.

Figure 4:
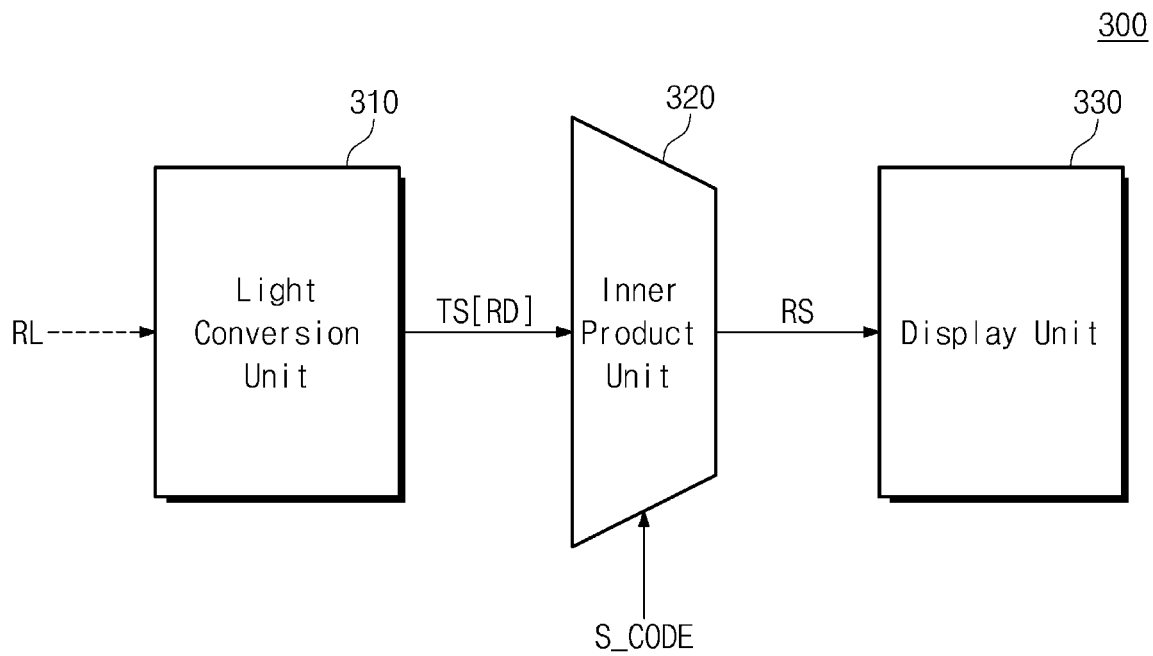
FIG. 4 is a diagram illustrating an example of a receiver of FIG. 1.
Figure 5:
FIG. 5 is a diagram for describing an operation of an inner product unit of FIG. 4.

FIG. 4 is a diagram illustrating an example of a receiver of FIG. 1. FIG. 5 is a diagram for describing an operation of an inner product unit of FIG. 4.

Referring to FIGS. 1 and 4, the receiver 300 may include a light conversion unit 310, an inner product unit 320, and a display unit 330.

The light conversion unit 310 may receive the reflected light RL from the sample SP. The light conversion unit 310 may be configured to generate a conversion signal TS by converting the reflected light RL into an electrical signal. The conversion signal TS may include reflection data RD. The reflection data RD may include information about the sample SP for each wavelength band. For example, information on the sample SP may include a degree of light absorption for each wavelength band of the sample SP or an image for each wavelength band of the sample SP.

For example, in the case of blood vessels in the liver, blood has a different degree of absorption for each wavelength band. When blood in blood vessels is rich in oxygen, the degree of absorption is high in a 900 nm band and low in a 660 nm band. Through images of the two wavelength bands, it is possible to distinguish where blood vessels are located in the liver.

In an embodiment, the light conversion unit 310 may be a camera. In an embodiment, the camera may be a black and white camera.

The reflection data RD may include all information about the samples SP of the first to sixth wavelength bands. The reflection data RD for each wavelength band may be orthogonal to a plurality of pieces of code information corresponding to other wavelength bands. For example, when information corresponding to the first wavelength band in the reflection data RD is inner-producted with any one of the second to sixth code information CODE2 to CODE6, the resulting value may be a negligible level of noise.

The inner product unit 320 may be configured to receive the conversion signal TS and the code signal S_CODE generated from the code generator 100. The inner product unit 320 may be configured to generate an extraction signal RS by performing an inner product on the reflection data RD based on a plurality of pieces of code information of the code signal S_CODE. The extraction signal RS may include information on the sample SP of a wavelength band corresponding to the inner-producted code information.

When code information is inner-producted with the reflection data RD, the size of a component matching the code information to be inner-producted in the reflection data RD may increase. In contrast, components that do not match (orthogonal to) with the code information that is inner-producted in the reflection data RD may have a value less than or equal to noise as the signals are canceled. Hereinafter, with reference to FIG. 5, generating a first extraction signal RS1 for a first wavelength band by performing an inner product on first code information CODE1 with reflection data RD through the inner product unit 320 will be described by way of example.

Referring to FIG. 5 together, when a hyperspectral image for a first wavelength band is extracted, the inner product unit 320 may select the first code information CODE1 from among a plurality of pieces of received code information. The inner product unit 320 may be configured to perform an inner product on the first code information CODE1 with the reflection data RD.

For example, the first code information CODE1 may be 16-bit information of "1001011001101001". The reflection data RD may include data of "a1 to a16" corresponding to the number of digits of each bit. When performing the inner product between the first code information CODE1 and the reflection data RD, it may be calculated as follows by substituting '1' for the bit of "1" and substituting '−1' for the bit of "0" of the first code information CODE1.

$$RS1 = \qquad\qquad\qquad\qquad\qquad\qquad\qquad\text{[Equation 1]}$$
$$CODE1 \cdot RD = a1x1 + a2x(-1) + a3x(-1) + a4x1 + a5x(-1) +$$
$$a6x1 + a7x1 + a8x(-1) + a9x(-1) + a10x1 + a11x1 +$$
$$a12x(-1) + a13x1 + a14x(-1) + a15x(-1) + a16x$$

In Equation 1, RS1 is a first extraction signal obtained by performing the inner product on the first code information CODE1. The first extraction signal RS1 may include information on the sample SP for the first wavelength band.

As in the above description, when obtaining information on the sample SP for an n-th wavelength band, the inner product unit 320 may generate an extraction signal by performing the inner product on the n-th code information with the reflection data RD.

The inner product unit 320 may include, for example, at least one of an integrated circuit, software, or firmware for performing the inner product.

Referring back to FIG. 4, the display unit 330 may be configured to receive an extraction signal. The display unit 330 may be configured to obtain a hyperspectral image based on the extraction signal. The hyperspectral image may represent information about the sample SP included in the extraction signal as an image.

The display unit 330 may include display devices capable of displaying a hyperspectral image. For example, the display device may include any one of a liquid crystal display (LCD), a light emitting diode (LED), an organic light emitting diode (OLED), a cathode ray tube (CRT) display, an e-Paper display, and a touch screen display.

In the case of an embodiment according to the present disclosure, a hyperspectral image may be obtained without using a spectral filter to split a band of wavelengths. Accordingly, the hyperspectral imaging device may be miniaturized, and thus, manufacturing and storage costs may be reduced.

Figure 6:
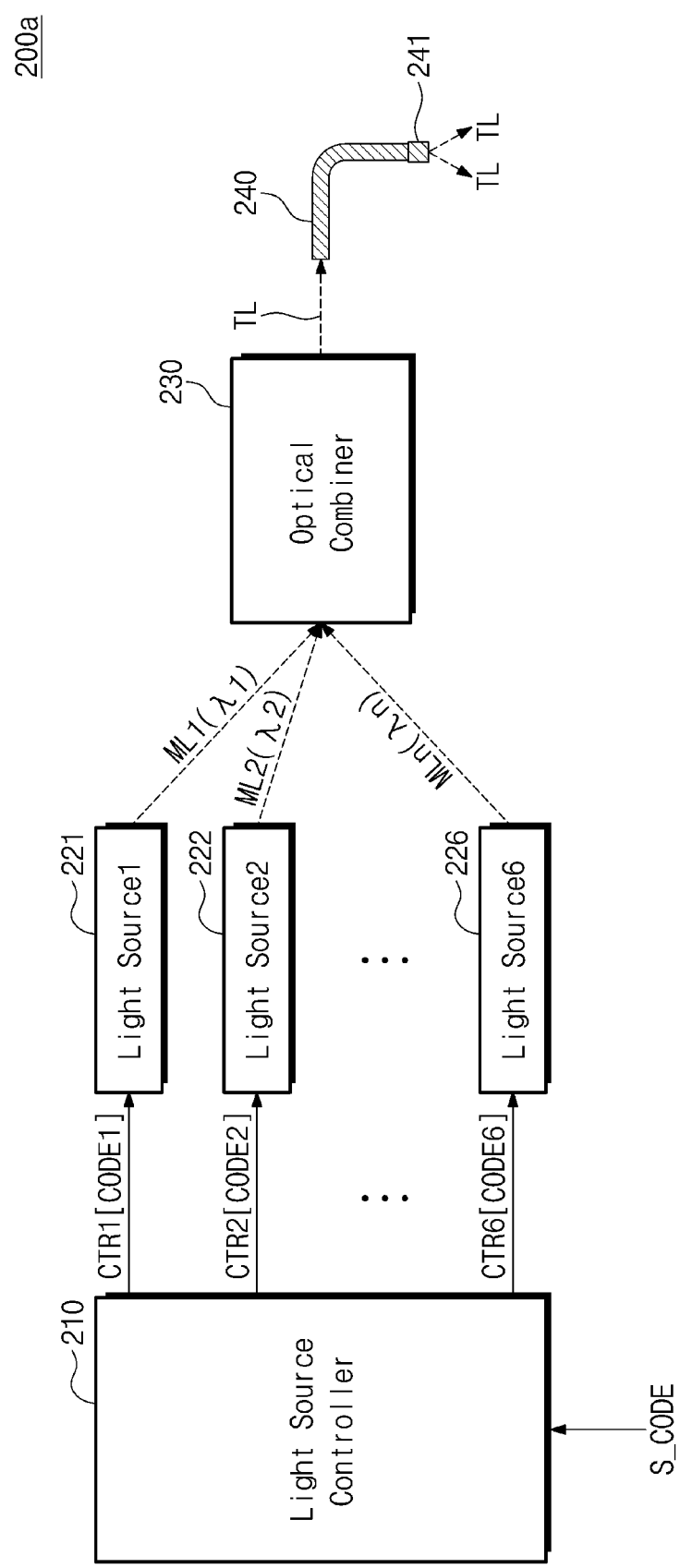
FIG. 6 is a diagram illustrating an example of a transmitter of FIG. 1.

FIG. 6 is a diagram illustrating an example of a transmitter of FIG. 1. Hereinafter, differences will be mainly described except for actually the same parts as the transmitter 200 described in FIGS. 1 and 2.

Referring to FIG. 6, in an embodiment, a transmitter 200a may include the light source controller 210, a plurality of light sources, an optical combiner 230, and an optical fiber 240. The light source controller 210 and the plurality of light sources may be actually the same as those of FIG. 2.

The optical combiner 230 may be configured to receive and focus modulated lights generated from the plurality of light sources. The modulated lights focused by the optical combiner 230 may be transferred through the optical fiber 240. An optical splitter 241 may be provided at one end of the optical fiber 240. The output light TL may be irradiated to the plurality of samples SP through the optical splitter 241.

In an embodiment, the output light TL generated by the transmitter may be transferred to the inside of a body through the optical fiber 240. For example, the optical fiber 240 may be included in an oral endoscope and may transfer the output light TL into the body. Accordingly, the hyperspectral imaging device according to the present disclosure may be used for medical purposes.

For example, the sample SP may be liver. In the case of blood vessels in the liver, blood absorption is different for each wavelength band. When blood in the blood vessels is rich in oxygen, absorption is high in the 900 nm band and absorption is low in the 660 nm band. Through the images of the two wavelength bands, it is possible to immediately distinguish where blood vessels are located in the liver, and a more distinct image of blood vessels may be obtained compared to existing RGB cameras. In this way, a necessary light source suitable for absorption and reflection characteristics of the sample SP may be selected, the modulation may be performed with a plurality of pieces of code information orthogonal to the light source, and the reflected images may be imaged simultaneously for each color.

Figure 7:
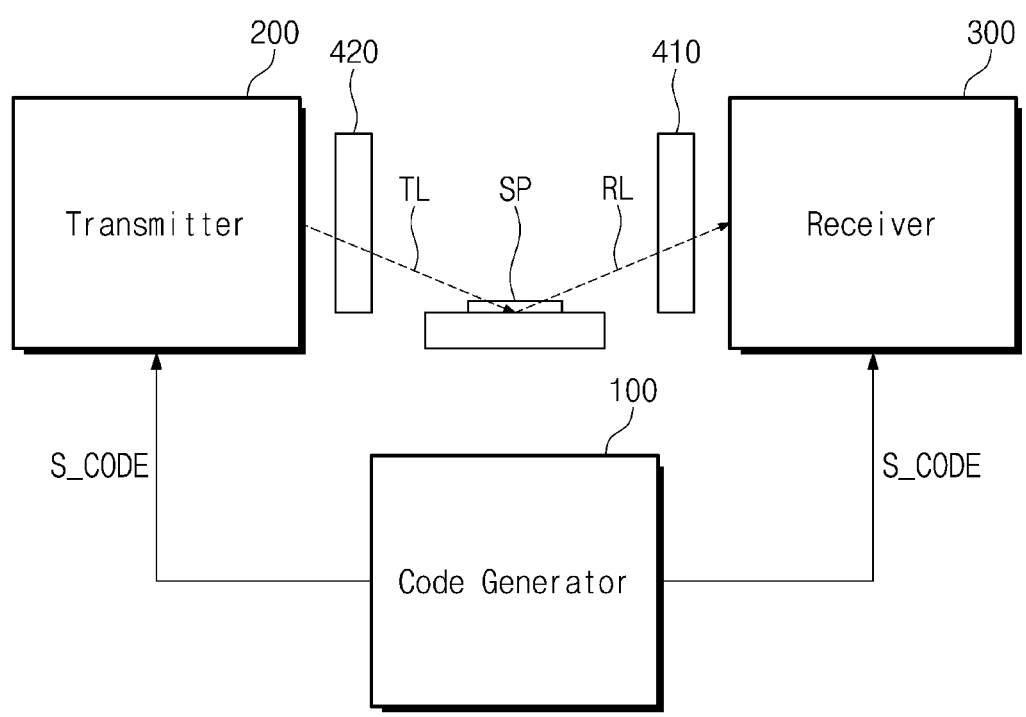
FIG. 7 is a diagram illustrating a hyperspectral imaging device according to an embodiment of the present disclosure.

FIG. 7 is a diagram illustrating a hyperspectral imaging device according to an embodiment of the present disclosure. Hereinafter, differences from the embodiment described in FIG. 1 will be mainly described except for actually the same parts.

Referring to FIG. 7, a hyperspectral imaging device 11 may include the code generator 100, the transmitter 200, the receiver 300, a first polarization filter 410, and a second polarization filter 420. The code generator 100, the transmitter 200, and the receiver 300 may be actually the same as those of FIG. 1.

The first polarization filter 410 may be provided between the receiver 300 and the sample SP. The first polarization filter 410 may be configured to transmit only the first direction component of light. The first polarization filter 410 may block reflection of the surface of the sample SP from the reflected light RL.

The second polarization filter 420 may be provided between the transmitter 200 and the sample SP. The second polarization filter 420 may be configured to transmit only the second direction component of light. The second direction may be perpendicular to the first direction.

Figure 8:
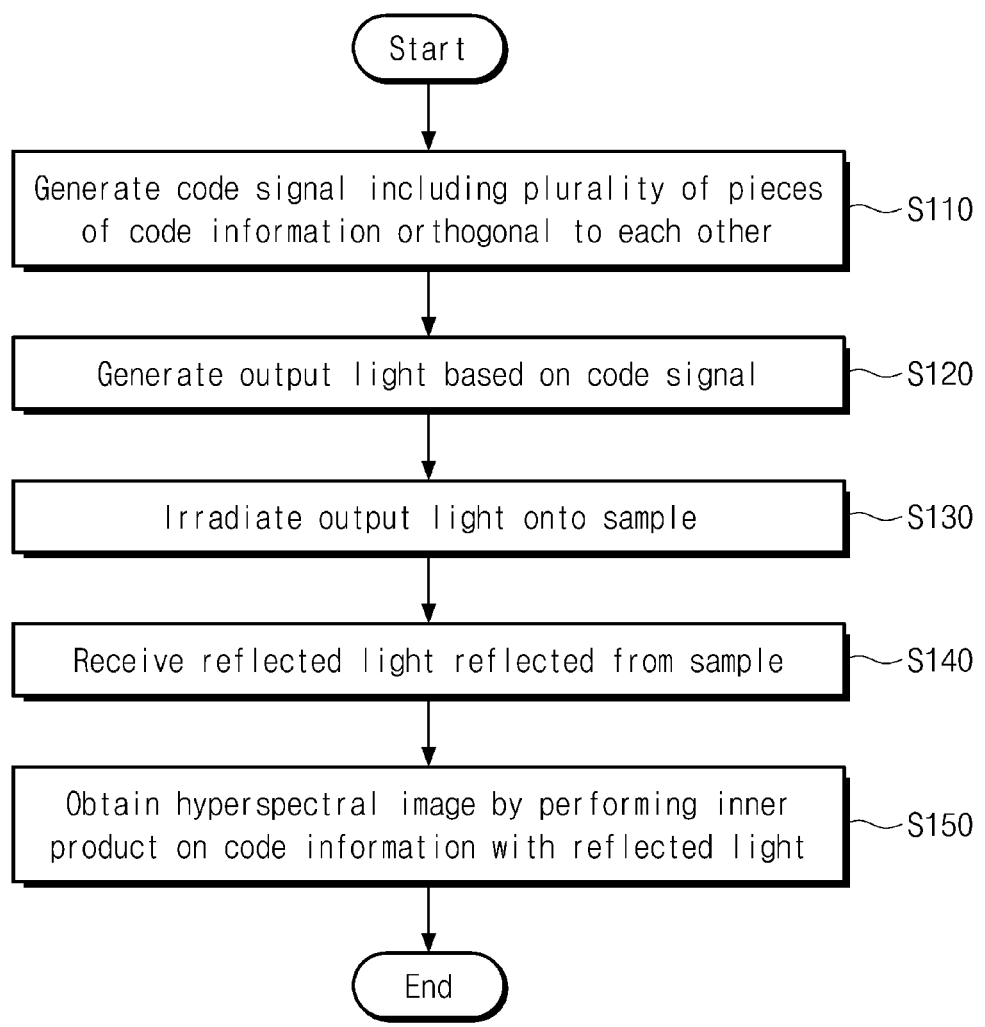
FIG. 8 is a diagram illustrating an operation method of a hyperspectral imaging device according to an embodiment of the disclosure.

FIG. 8 is a diagram illustrating an operation method of a hyperspectral imaging device according to an embodiment of the disclosure. Hereinafter, FIG. 8 will be described with reference to the hyperspectral imaging device of FIG. 1 together.

Referring to FIGS. 1 and 8, in operation S110, the code generator 100 may generate the code signal S_CODE including a plurality of pieces of code information orthogonal to each other. For example, the plurality of pieces of code information may be Walsh codes.

In operation S120, the transmitter 200 may generate the output light TL based on the plurality of pieces of code information of the code signal S_CODE. The output light TL may include a plurality of modulated lights having different wavelength bands. The code information may be encoded in each of the modulated lights. For example, the transmitter may encode each piece of code information into modulated light using a pulse amplitude modulation (PAM) method.

In operation S130, the output light TL may be irradiated onto the sample SP. The output light TL irradiated to the sample SP may be reflected by the sample SP.

In operation S140, the receiver 300 may receive the reflected light RL reflected from the sample SP. The reflected light RL may include the reflected data RD. The reflection data RD may include information about the samples SP for each wavelength band.

In operation S150, the receiver 300 may obtain a hyperspectral image from the reflected light RL based on the code signal S_CODE. First, the conversion signal TS may be generated by converting the received reflected light RL into an electrical signal. The conversion signal TS may include the reflection data RD including data on the sample SP for each wavelength band. For example, the image of the sample SP of a specific wavelength band may be extracted by performing the inner product on the code information for a desired wavelength band with the reflection data RD of the reflected light RL. In detail, the hyperspectral image including information about the sample SP of the first wavelength band may be obtained by performing the inner product on the first code information CODE1 with the reflection data RD.

According to an embodiment of the present disclosure, a hyperspectral imaging device that does not use a spectral filter may be provided.

According to an embodiment of the present disclosure, a hyperspectral imaging device that is miniaturized and has low manufacturing cost may be provided.

According to an embodiment of the present disclosure, a method for obtaining a hyperspectral image without using a spectral filter may be provided.

According to an embodiment of the present disclosure, a method for obtaining a hyperspectral image method that is miniaturized and has low manufacturing cost may be provided.

The effects that are achieved through present disclosure may not be limited to what has been particularly described herein, and other effects not described herein may be more clearly understood from the following detailed description by persons skilled in the art.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A hyperspectral imaging device comprising:
  a code generator configured to generate a code signal including first code information and second code information which are orthogonal to each other;
  a light transmitter configured to receive the code signal and to generate output light including first modulated light modulated based on the first code information and second modulated light modulated based on the second code information; and a receiver configured to receive reflected light from which the output light is reflected from a sample, and to obtain a hyperspectral image based on the reflected light and the code signal, and wherein the first modulated light has a first wavelength band and the second modulated light has a second wavelength band different from the first wavelength band wherein the transmitter includes:
a light source controller configured to receive the code signal and to generate a first control signal based on the first code information and a second control signal based on the second code information;
a first light source configured to generate the first modulated light based on the first control signal; and
a second light source configured to generate the second modulated light based on the second control signal,
wherein the first light source is configured to generate the first modulated light by adjusting a time for generating light based on the first code information, and wherein the second light source is configured to generate the second modulated light by adjusting a time for generating light based on the second code information,
wherein a number of bits in the first and second code information is increased for a static image with high sharpness and decreased for real-time images.

2. The hyperspectral imaging device of claim 1, wherein each of the first light source and the second light source is a pulse laser or a light-emitting diode (LED).

3. The hyperspectral imaging device of claim 1, wherein the first light source and the second light source are configured to encode the first code information and the second code information into the first modulated light and the second modulated light by a pulse amplitude modulation method.

4. The hyperspectral imaging device of claim 1, wherein the transmitter further includes:
an optical combiner configured to focus the first modulated light and the second modulated light; and
an optical fiber configured to transfer the focused first modulated light and the second modulated light.

5. The hyperspectral imaging device of claim 1, wherein the receiver includes:
a light conversion unit configured to generate a conversion signal by converting the reflected light into an electrical signal, the conversion signal being including reflection data including data on the sample for each wavelength band; and
an inner product unit configured to perform an inner product of the reflection data and the first code information to generate an extraction signal including information on the sample in the first wavelength band.

6. The hyperspectral imaging device of claim 5, wherein the light conversion unit is a camera.

7. The hyperspectral imaging device of claim 5, wherein the inner product unit is configured to perform the inner product by substituting '1' for an "1" bit of the first code information and by substituting '−1' for a "0" bit of the first code information.

8. The hyperspectral imaging device of claim 7, wherein the inner product unit includes at least one of an integrated circuit, software, or firmware for performing the inner product.

9. The hyperspectral imaging device of claim 5, wherein the receiver further includes a display unit configured to display the hyperspectral image based on the extraction signal.

10. The hyperspectral imaging device of claim 9, wherein the display unit includes any one of a liquid crystal display (LCD), a light emitting diode (LED), an organic light emitting diode (OLED), a cathode ray tube (CRT) display, an e-Paper display, and a touch screen display.

11. The hyperspectral imaging device of claim 1, wherein the first code information and the second code information are Walsh codes.

12. The hyperspectral imaging device of claim 1, further comprising:
a first polarization filter provided between the receiver and the sample and configured to transmit only components in a first direction; and
a second polarization filter provided between the transmitter and the sample and configured to transmit only components in a second direction perpendicular to the first direction.

13. A method of operating a hyperspectral imaging device, the method comprising:
generating a code signal including first code information and second code information which are orthogonal to each other;
generating output light based on the code signal, the output light being including first modulated light encoded with the first code information and second modulated light encoded with the second code information;
irradiating the output light onto a sample;
receiving reflected light reflected from the sample; and
obtaining a hyperspectral image from the reflected light based on the code signal
wherein the first modulated light and the second modulated light are generated by encoding the first code information and the second code information by a pulse amplitude modulation method,
wherein the first light source generates the first modulated light by adjusting a time for generating light based on the first code information, and wherein the second light source generates the second modulated light by adjusting a time for generating light based on the second code information,
wherein a number of bits in the first and second code information is increased for a static image with high sharpness and decreased for real-time images.

14. The method of claim 13, wherein the obtaining of the hyperspectral image includes:
generating a conversion signal by converting the reflected light into an electrical signal, the conversion signal being including reflection data including data on the sample for each wavelength band; and
performing an inner product on the reflection data and the first code information to obtain a hyperspectral image including information on the sample in the first wavelength band.

15. The method of claim 13, wherein the first code information and the second code information are Walsh codes.

* * * * *